US012580665B2

(12) United States Patent
Shapoury

(10) Patent No.: US 12,580,665 B2
(45) Date of Patent: Mar. 17, 2026

(54) SYSTEMS AND METHODS FOR COMMUNICATING AND SENSING THROUGH PLASMA

(71) Applicant: THE BOEING COMPANY, Chicago, IL (US)

(72) Inventor: Alireza Shapoury, Santa Ana, CA (US)

(73) Assignee: The Boeing Company, Arlington, VA (US)

( * ) Notice: Subject to any disclaimer, the term of this patent is extended or adjusted under 35 U.S.C. 154(b) by 560 days.

(21) Appl. No.: 18/062,613

(22) Filed: Dec. 7, 2022

(65) Prior Publication Data

US 2024/0195514 A1     Jun. 13, 2024

(51) Int. Cl.
| | |
|---|---|
| *H04B 15/00* | (2006.01) |
| *B64C 30/00* | (2006.01) |
| *B64D 47/00* | (2006.01) |
| *H01Q 1/28* | (2006.01) |
| *H04B 7/26* | (2006.01) |

(52) U.S. Cl.
CPC ............ *H04B 15/00* (2013.01); *B64C 30/00* (2013.01); *B64D 47/00* (2013.01); *H01Q 1/28* (2013.01); *H04B 7/2603* (2013.01)

(58) Field of Classification Search
CPC ................ H04B 7/185; H04B 7/18502; H04B 7/18504; H04B 7/18506; H04B 7/24; H04B 7/2603; H04B 15/00; B64C 30/00; B64D 47/00; H01Q 1/27; H01Q 1/28
See application file for complete search history.

(56) References Cited

U.S. PATENT DOCUMENTS

| | | | | |
|---|---|---|---|---|
| 8,787,246 | B2 * | 7/2014 | Brownrigg ......... | H04B 7/18506 370/316 |
| 2017/0264015 | A1 * | 9/2017 | Stratis .................... | H01Q 1/281 |
| 2022/0181789 | A1 * | 6/2022 | Onishi ..................... | H01Q 1/28 |
| 2022/0200642 | A1 * | 6/2022 | Agrawal .............. | H04B 1/0458 |

OTHER PUBLICATIONS

Xiaotian Gao et al: "A matching approach to communicate through the plasma sheath surrounding a hypersonic vehicle," Journal of Applied Physics 117, 233301 (2015), pp. 1-5.
Jianjun Cheng et al: "An electromagnetic method for removing the communication blackout with a space vehicle upon re-entry into the atmosphere," Journal of Applied Physics 121, 093301 (2017).
R.A. Hartunian et al: "Causes and Mitigationof Radio Frequency (RF) Blackout During Reentry of Reusable Launch Vehicles," Aerospace Report No. ATR-2007(5309)-1, pp. 1-103.

(Continued)

*Primary Examiner* — Quochien B Vuong
(74) *Attorney, Agent, or Firm* — Joseph M. Butscher; Carroll, Hoette & Butscher, LLC

(57)     ABSTRACT

A system and a method for communicating through a plasma sheath formed on a vehicle, include a matching layer disposed on at least a portion of a communication device of the vehicle. The matching layer is configured to generate a resonant frequency in relation to the plasma sheath. A modulator is configured to generate one or more electromagnetic waves that modulate the resonant frequency.

20 Claims, 2 Drawing Sheets

(56)            References Cited

OTHER PUBLICATIONS

Bogatskaya: "Toward the Nonstationary Theory of a Telecommunication Channel Through a Plasma Sheet," IEEE Transactions on Antennas and Propagation, Jun. 2020, pp. 4831-4838.
Bogatskaya: "Resonant interaction of electronmagnetic wave with plasma layer and overcoming the radiocommunication blackout problem," Journal of Physics D; Applied Physics, Institute of Physics Publishing, Bristol GB, vol. 51, No. 18, Apr. 2018, p. 185602.
Extended European Search Report for EP 23210714.4-1205, dated Apr. 5, 2024.

* cited by examiner

100

SYSTEMS AND METHODS FOR COMMUNICATING AND SENSING THROUGH PLASMA

FIELD OF THE DISCLOSURE

Examples of the subject disclosure generally relate to systems and methods for communicating and sensing through plasma, and more particularly to vehicles including systems and methods for communicating through plasma.

BACKGROUND OF THE DISCLOSURE

Plasma is the fourth state of matter, and generally is an ionized gas phase substance including ions, electrons, neutral atoms, and/or molecules. Charged particles in plasma collectively respond to external electromagnetic fields. Because electrons are lighter than ions, electrons can escape from plasma fastener than ions if there is no confining potential barrier. Once electrons are substantially depleted from a boundary interface between plasma and electrodes, a region with only positive ions and neutral atoms is formed, which is typically referred to as a plasma sheath.

A vehicle, such as a hypersonic aircraft or spacecraft, can create a turbulent plasma sheath at high speeds, such as speeds above Mach-8. The plasma sheath can hinder communication and over-the-horizon radar, for example. Indeed, the vehicle can experience a communication blackout over at least a portion of travel due to the plasma sheath.

SUMMARY OF THE DISCLOSURE

A need exists for a system and a method for communicating through plasma. Further, a need exists for a vehicle that includes a system for communicating through a plasma sheath.

With those needs in mind, certain examples of the present disclosure provide a system for communicating through a plasma sheath formed on a vehicle. The system includes a matching layer disposed on at least a portion of a communication device of the vehicle. The matching layer is configured to generate a resonant frequency in relation to the plasma sheath. A modulator is configured to generate one or more electromagnetic waves that modulate the resonant frequency.

In at least one example, the communication device is configured to one or both of transmit or receive one or more communication signals at one or more zero crossings.

In at least one example, a control unit is configured to operate the modulator to modulate the resonant frequency.

The vehicle can be a hypersonic aircraft or a spacecraft, for example.

In at least one example, the communication device includes one or more antennas. In at least one further example, the one or more antennas are configured to operate at or above 30 GHz.

In at least one example, the matching layer is a layer of electrically insulating material.

In at least one example, the portion of the communication device is a boresight.

In at least one example, the matching layer is disposed between the communication device and an outer portion of the vehicle.

In at least one example, the modulator includes one or more anodes, one or more cathodes, and one or more electromagnets.

In at least one example, the resonant frequency is 2 GHz.

Certain examples of the present disclosure provide a method for communicating through a plasma sheath formed on a vehicle. The method includes disposing a matching layer on at least a portion of a communication device of the vehicle; generating, by the matching layer, a resonant frequency in relation to the plasma sheath; and generating, by a modulator, one or more electromagnetic waves that modulate the resonant frequency.

Certain examples of the present disclosure provide a hypersonic vehicle including a system for communicating through a plasma sheath formed on the hypersonic vehicle, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Figure 1:
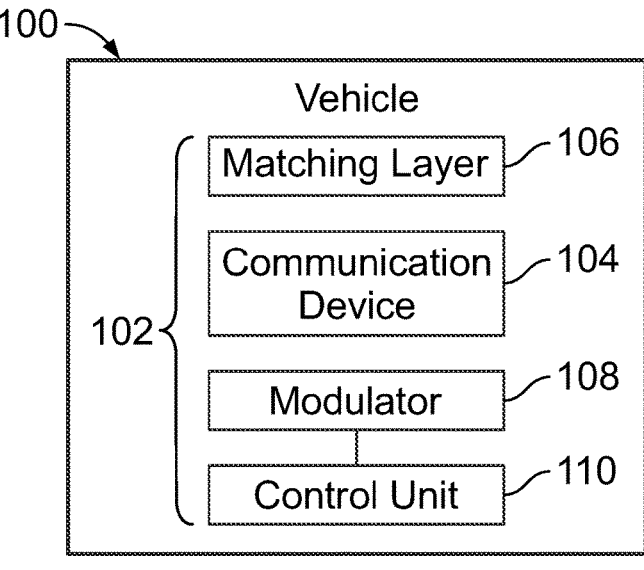
FIG. 1 illustrates a block diagram of a vehicle including a system for communicating through plasma, according to an example of the present disclosure.

FIG. 1 illustrates a block diagram of a vehicle 100 including a system 102 for communicating through plasma, according to an example of the present disclosure. The communicating includes sensing through the plasma, such as via radar. The vehicle 100 can be an aircraft, a spacecraft, or a land-based vehicle. For example, the vehicle 100 can be a commercial or military aircraft, such as can achieve hypersonic flight (such as exceeding Mach-5). As another example, the vehicle 100 is a space vehicle, such as a space launch vehicle (for example, a rocket, space shuttle, or the like) that can reach hypersonic speeds. As another example, the vehicle 100 can be a hypersonic weapons system or platform. As another example, the vehicle 100 can be a land-based vehicle, such as a magnetic levitation vehicle.

The system 102 includes a communication device 104, a matching layer 106, a modulator 108, and a control unit 110. In at least one example, the communication device 104 is one or more antennas of the vehicle 100. The antenna(s) is configured to output and receive communication signals. As another example, the communication device 104 can be a transmitter and/or a receiver. In at least one example, the communication device 104 is a high frequency antenna that is configured to operate at or above 30 GHz with pulsetrain-based waveforms.

The matching layer 106 is configured to cover at least a portion of the communication device 104 and/or the vehicle 100. In at least one example, the matching layer 106 is or otherwise includes a layer of electrically insulating material disposed on a radiating surface of the communication device 104 (for example, a portion of the communication device 104, such as an antenna). In at least one example, the matching layer 106 is secured over an outer surface of the vehicle 100, such as over the communication device 104. As a further example, the matching layer 106 covers or is otherwise disposed over an aperture of the communication device 104. For example, the matching layer 106 is disposed over a boresight of the communication device 104, such as an antenna. In at least one example, the matching layer 106 is disposed between the communication device 104 and an outer portion of the vehicle, and/or an outside of the vehicle 100. In this manner, the matching layer 106 is disposed between the communication device 104 and a plasma sheath that may form on an outer surface of the vehicle 100. In at least one other example, the matching layer 106 can cover an entirety of the vehicle 100. In at least one example, the matching layer is formed of an electrically insulating material, such as a ceramic, which can include different alloys, dopants, and/or the like.

In at least one example, the matching layer is 1 centimeter thick. As another example, the matching layer is 0.5 centimeters thick. Optionally, the matching layer can be less than 0.5 centimeters thick or greater than 1 centimeter thick.

The control unit 110 is operatively coupled to the modulator 108, such as through one or more wired or wireless connections. In at least one example, the modulator 108 is or otherwise includes one or more anodes, one or more cathodes, and one or more electromagnets. The modulator 108 can be a microelectromechanical system including one or more magnets, one or more anodes with metal targets, a focusing electrode, a gate electrode, one or more cathodes, and one or more additional anodes. The control unit 110 is configured to control the modulator 108, as described herein.

Plasma frequency, among other things, mainly depends on an effective plasma sheet thickness, which can range in density. The plasma sheath both absorbs and reflects incoming signals close to a plasma frequency, resulting in a resonating electric field within the plasma itself. It has been found that the plasma sheath can have a resonant frequency around or below 2 GHz (for example, +/−0.5 GHZ), based on the thickness of the plasma sheet.

The matching layer 106 acts a resonator. The matching layer 106, as a resonator, is configured to store electrical energy. As the vehicle 100 travels at hypersonic speed (for example, Mach-8), a plasma sheath can form on an outer surface of the vehicle 100. In combination with the plasma sheath, the matching layer 106 generates resonant conditions during hypersonic travel. The matching layer 106 acts like a shutter or pass through-medium for the communication device 104, which can be a high frequency antenna. While at higher frequencies (for example at 30 GHz or higher), transmission and reception of communication signals through the plasma sheath occurs.

Reliable, continuous communications, through plasma is desirable, particularly with respect to commercial space launch vehicles, defense weaponry, commercial aircraft, military aircraft, and the like. Additionally, the matching layer 106 provides protection against jamming, high power microwave attack, and the like. For example, the matching layer 106 can block certain electromagnetic waves, such as microwaves.

As shown, the system 102 includes the communication device 104, and the matching layer 106, which is or otherwise includes an electrically insulating material that generates stable plasma resonant conditions at a lower frequency (such as at 1 GHz or less) during hypersonic travel of the vehicle 100. The control unit 110 senses or communicates at higher frequencies (for example, at 30 GHz or higher) than the lower frequency at zero crossings of the resonant frequency (for example, 2 GHZ) to allow communication through the plasma which is generated during the hypersonic travel.

The system 102 eliminates, minimizes, or otherwise reduces communication blackouts, which can otherwise be caused by a plasma sheath, such as during hypersonic flight of an aircraft, spacecraft, or the like. The matching layer 106 provides an insulating material that acts as a low frequency resonator on the communication device 104, such as a high frequency antenna. The plasma sheath stabilizes a frequency caused by the plasma. Specifically, the resonant frequency can be around or below 2 GHz (such as +/−0.5 GHZ). In a temporally stabilized resonant frequency, the loci of the maxima and minima of the electric field across the plasma sheath becomes pseudo-stationary. By monitoring the field variation, the resonant frequency can be determined and temporally synchronized. During short interval at or near zero crossings (that is, times when the sign of electric field changes, minimally interfering field strength from plasma resonance), higher frequency communication from the communication device 104 are sent when the 2 GHz wave does not interfere with communication. For example, the communication device 104 outputs communication signals at zero crossings. By communicating at the zero crossings of the 2 GHz stabilized frequency, communication can be sent/received at, for example 30 GHz, despite the presence of the plasma sheath. Notably, the matching layer 106 stabilizes the resonant frequency of the plasma sheath, such as at or around 2 GHz. At a stable resonance (such as at the 2 GHz stabilized frequency), an electromagnetic wave temporally and spatially traps particles of the plasma sheath, which opportunistically opens intermittent communication and sensing windows.

In at least one example, the matching layer 106 couples to the portion of the vehicle 100 to provide the resonant frequency in relation to the plasma sheath on an outer portion of the vehicle 100, such as during hypersonic flight. The resonant frequency is at or around 2 GHz (such as +/−0.5 GHz). The modulator 108 modulates the plasma sheath through a generated electromagnetic wave. For example, the control unit 110 operates the modulator 108 to generate the electromagnetic wave. The generated electromagnetic wave modulates the resonant frequency to produce zero crossings (that is, the points where the sign of the frequency changes, such as an instantaneous point where no voltage is present). At the zero crossings, communication signals can be transmitted and/or received in relation to the communication device 104 through the plasma sheath. As such, the modulator 108 generates the electromagnetic wave to operate the matching layer 106 as a shutter that allows for communication at the zero crossings.

As noted, the matching layer 106 is an electrically insulating material, which can be directly disposed on a radiating surface of the communication device 104. For example, the matching layer 106 covers a boresight of an antenna. The matching layer 106 is configured to store electrical energy. When a plasma sheath is present on the surface of the vehicle 100, the matching layer 106 generates resonant conditions, such as during hypersonic flight of the vehicle 100. In particular, the matching layer 106 is configured to match a resonant frequency of the plasma sheath, such as at or around 2 GHz. The communication device 104, such as a high frequency antenna (for example, an antenna configured to communicate at frequency at or above 30 GHZ), is disposed behind the matching layer 106. The matching layer 106 covers the communication device 104 such that the matching layer 106 is disposed between the plasma sheath and the communication device 104. When the control unit 110 operates the modulator 108 to generate the electromagnetic wave(s), the matching layer 106 acts like a shutter or other selective pass through medium, such as at the zero crossings, so that communication signals (such as high frequency signals at or above 30 GHZ) can be transmitted and received by the communication device 104.

As described herein, the system 102 is configured for communicating through a plasma sheath formed on the vehicle 100. The system 102 includes the matching layer 106 disposed on at least a portion of the communication device 104 of the vehicle 100. The matching layer 106 is configured to generate a resonant frequency in relation to the plasma sheath. The modulator 108 is configured to generate one or more electromagnetic waves that modulate the resonant frequency. In at least one example, the communication device 104 is configured to one or both of transmit or receive one or more communication signals at one or more zero crossings of the resonant frequency as modulated by the modulator 108. In at least one example, the control unit 110 is configured to operate the modulator 108 to modulate the resonant frequency.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 110 can be or include one or more processors that are configured to control operation, as described herein.

The control unit 110 is configured to execute a set of instructions that are stored in one or more data storage units or elements (such as one or more memories), in order to process data. For example, the control unit 110 can include or be coupled to one or more memories. The data storage units can also store data or other information as desired or needed. The data storage units can be in the form of an information source or a physical memory element within a processing machine.

The set of instructions may include various commands that instruct the control unit 110 as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program, or a portion of a program. The software can also include modular programming in the form of object-oriented programming. The processing of input data by the processing machine may be in response to user commands, or in response to results of previous processing, or in response to a request made by another processing machine.

The diagrams of examples herein illustrate one or more control or processing units, such as the control unit 110. It is to be understood that the processing or control units can represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 110 can represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
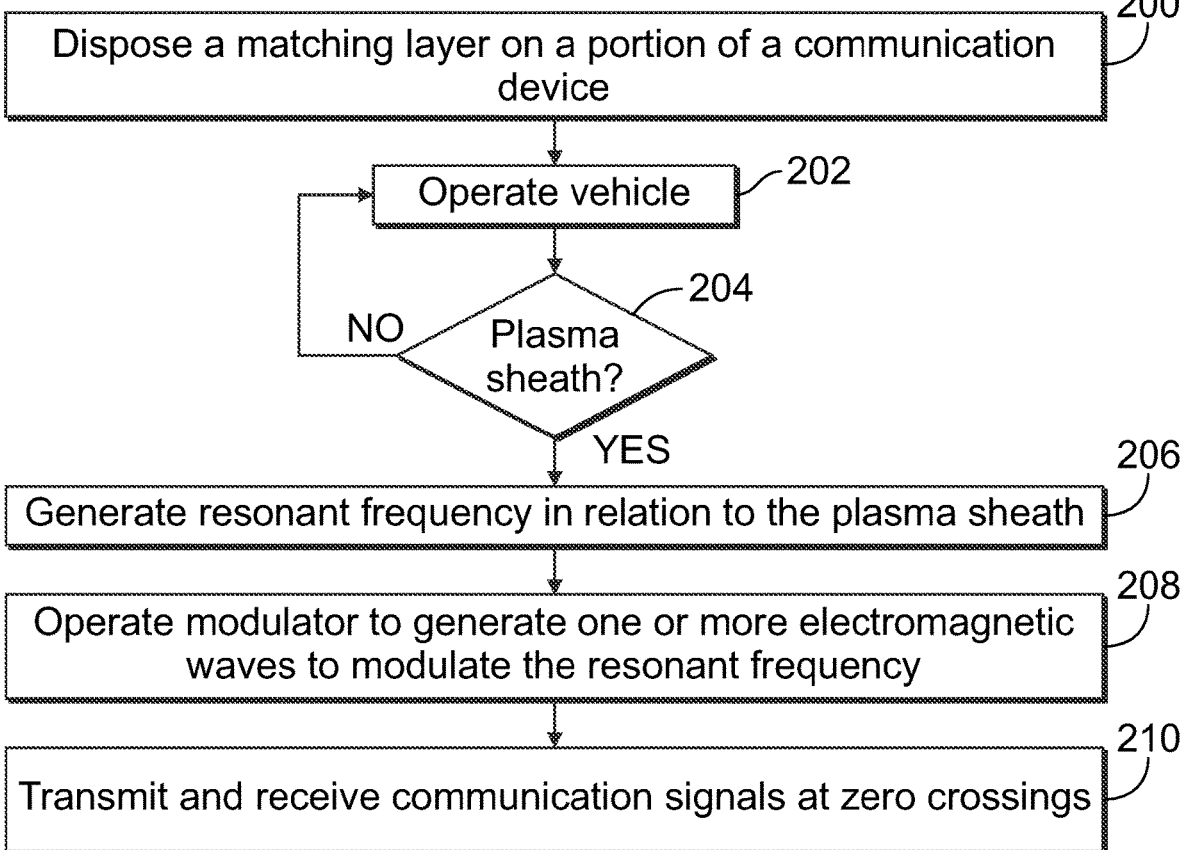
FIG. 2 illustrates a flow chart of a method for communicating through plasma during operation of a vehicle, according to an example of the present disclosure.

FIG. 2 illustrates a flow chart of a method for communicating through plasma during operation of a vehicle, according to an example of the present disclosure. Referring to FIGS. 1 and 2, at 200, the matching layer 106 is disposed on at least a portion of the vehicle 100, such as on at least a portion of the communication device 104. At 202, the vehicle 100 is operated, such as to travel to a particular destination. If, at 204, there is no plasma sheath formed on an outer portion of the vehicle 100, the method returns to 202.

If, however, a plasma sheath forms on the vehicle 100, the method proceeds from 204 to 206, at which the matching layer 106 generates a resonant frequency in relation to the plasma sheath. At 208, the modulator 108 is operated (such as by the control unit 110) to generate one or more electromagnetic waves that modulate the resonant frequency. At 210, the communication device 104 transmits and/or receives communication signals at zero crossings. In at least one example, the control unit 110 can be in communication with the communication device, such as through one or more wired or wireless connections, and configured to operate the communication device 104 to transmit and/or receive the communication signals at the zero crossings. For example, the communication device 104 may not be activated when the resonant frequency is not at a zero crossing. Instead, the control unit 110 may determine the times of the zero crossings, and activate the communication device 104 to transmit and receive the communication signals during the times of the zero crossings. Optionally, the communication device 104 may be active during periods when the resonant frequency is not at the zero crossings.

Figures 3, 4:
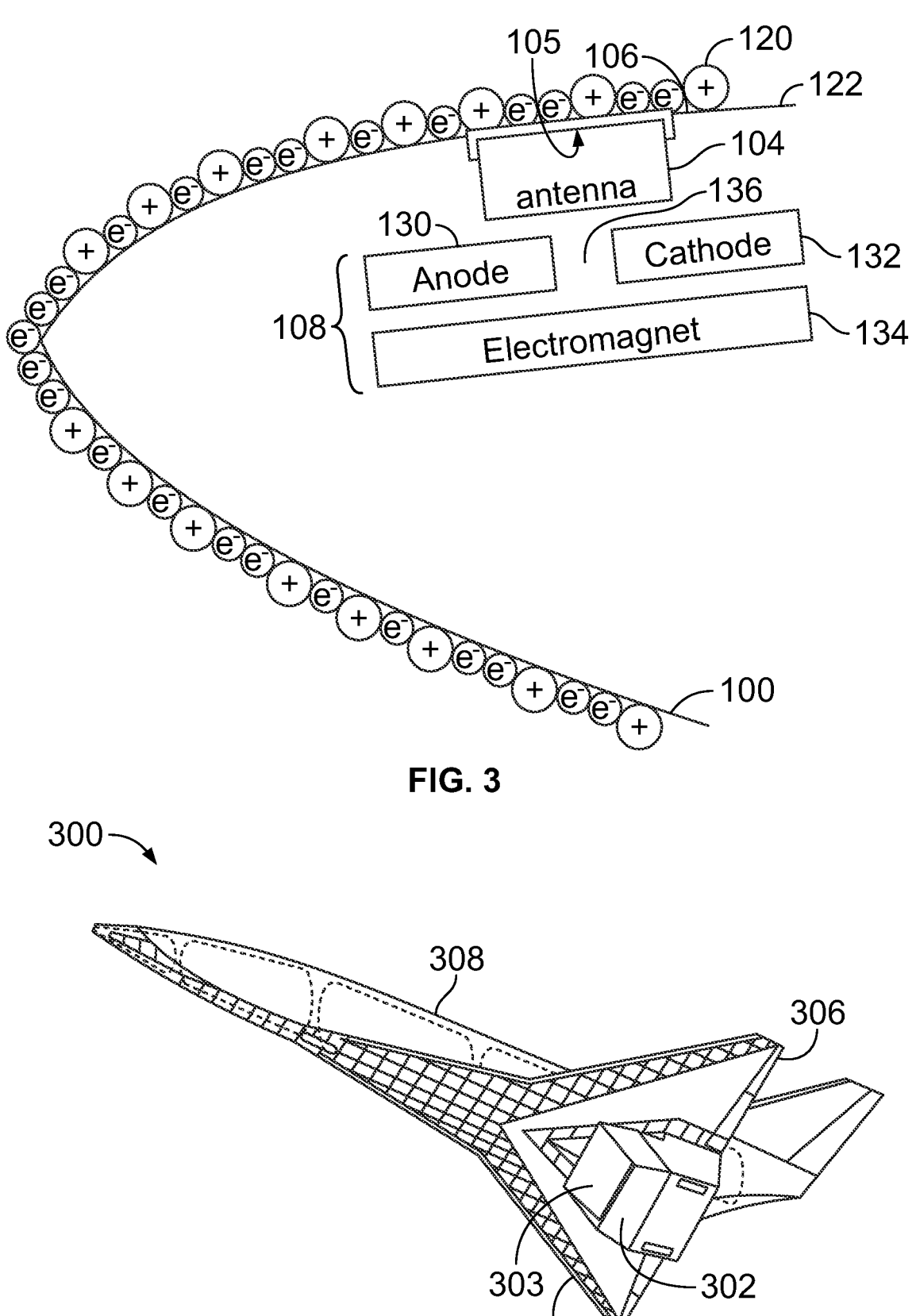
FIG. 3 illustrates a simplified lateral view of a portion of a vehicle, according to an example of the present disclosure.
FIG. 4 illustrates an isometric bottom view of an aircraft, according to an embodiment of the subject disclosure.

FIG. 3 illustrates a simplified lateral view of a portion of a vehicle 100, according to an example of the present disclosure. The portion of the vehicle 100 can be a front portion, such as nose of an aircraft or spacecraft. The communication device 104 is an antenna. The matching layer 106 covers at a least a portion of the communication device 104. For example, the matching layer 106 covers a boresight 105 of the communication device 104 (such as an antenna), and is disposed between the communication device 104 and a plasma sheath 120 that forms on an outer surface 122 of the vehicle 100. In at least one example, the modulator 108 includes an anode 130, a cathode 132, and an electromagnet 134. The communication device 104 can be disposed above a gap 136 between the anode 130 and the cathode 132.

The modulator 108 is operated to generate an electromagnetic wave. At the resonant frequency (for example, 2 GHZ) produced by the matching layer 106 interacting with the plasma sheath 120, the generated electromagnetic wave temporally and spatially traps portions of the plasma sheath (such as one or more charged particles), which thereby provides a shutter effect that intermittently opens communication and sensing windows.

It is to be understood that the configuration shown in FIG. 3 is merely exemplary. The communication device 104 can include more than one antenna, for example. As another example, the modulator 108 can include more, less, and/or different components than shown in FIG. 3.

FIG. 4 illustrates an isometric bottom view of an aircraft 300, according to an example of the subject disclosure. The aircraft 300 is an example of the vehicle 100 shown in FIGS. 1 and 3. In at least one example, the aircraft 300 is a hypersonic jet. The aircraft 300 includes a propulsion system 302 that an air inlet 303, for example. Wings 306 are coupled to a fuselage 308 of the aircraft 300. The wings 306 and/or the fuselage 308 can support the propulsion system 302. In other embodiments, the engines 304 may be carried by other portions of the aircraft 300. Optionally, the aircraft 300 can be sized, shaped, and configured differently than shown. The aircraft 300 can be various other types of military or commercial aircraft. In at least one other example, the aircraft 300 is not a hypersonic jet. As another example, the aircraft 300 can be an unmanned aerial vehicle (UAV).

Further, the disclosure comprises examples according to the following clauses:

Clause 1. A system for communicating through a plasma sheath formed on a vehicle, the system comprising:

a matching layer disposed on at least a portion of a communication device of the vehicle, wherein the matching layer is configured to generate a resonant frequency in relation to the plasma sheath; and a modulator configured to generate one or more electromagnetic waves that modulate the resonant frequency.

Clause 2. The system of Clause 1, wherein the communication device is configured to one or both of transmit or receive one or more communication signals at one or more zero crossings.

Clause 3. The system of Clauses 1 or 2, further comprising a control unit configured to operate the modulator to modulate the resonant frequency.

Clause 4. The system of any of Clauses 1-3, wherein the vehicle is one of a hypersonic aircraft or spacecraft.

Clause 5. The system of any of Clauses 1-4, wherein the communication device comprises one or more antennas.

Clause 6. The system of Clause 5, wherein the one or more antennas are configured to operate at or above 30 GHz.

Clause 7. The system of any of Clauses 1-6, wherein the matching layer is a layer of electrically insulating material.

Clause 8. The system of any of Clauses 1-7, wherein the portion of the communication device is a boresight.

Clause 9. The system of any of Clauses 1-8, wherein the matching layer is disposed between the communication device and an outer portion of the vehicle.

Clause 10. The system of any of Clauses 1-9, wherein the modulator comprises:

one or more anodes;

one or more cathodes; and one or more electromagnets.

Clause 11. The system of any of Clauses 1-10, wherein the resonant frequency is 2 GHz.

Clause 12. A method for communicating through a plasma sheath formed on a vehicle, the method comprising:

disposing a matching layer on at least a portion of a communication device of the vehicle;

generating, by the matching layer, a resonant frequency in relation to the plasma sheath; and generating, by a modulator, one or more electromagnetic waves that modulate the resonant frequency.

Clause 13. The method of Clause 12, further comprising one or both of transmitting or receiving, by the communication device, on or more communication signals at one or more zero crossings.

Clause 14. The method of Clauses 12 or 13, further comprising operating, by a control unit, the modulator to modulate the resonant frequency.

Clause 15. The method of any of Clauses 12-14, wherein the vehicle is one of a hypersonic aircraft or spacecraft.

Clause 16. The method of any of Clauses 12-15, wherein the communication device comprises one or more antennas to operate at or above 30 GHz, and wherein the resonant frequency is 2 GHz.

Clause 17. The method of any of Clauses 12-16, wherein said disposing comprises disposing the matching layer between the communication device and an outer portion of the vehicle.

Clause 18. A hypersonic vehicle comprising:

a system for communicating through a plasma sheath formed on the hypersonic vehicle, the system comprising:

a communication device;

a matching layer disposed on at least a portion of the communication device, wherein the matching layer is a layer of electrically insulating material, wherein the matching layer is configured to generate a resonant frequency in relation to the plasma sheath, and wherein the matching layer is disposed between the communication device and an outer portion of the vehicle;

a modulator configured to generate one or more electromagnetic waves that modulate the resonant frequency; and a control unit configured to operate the modulator to modulate the resonant frequency, wherein the communication device is configured to one or both of transmit or receive one or more communication signals at one or more zero crossings.

Clause 19. The hypersonic vehicle of Clause 18, wherein the communication device comprises one or more antennas configured to operate at or above 30 GHz, and wherein the resonant frequency is 2 GHz.

Clause 20. The hypersonic vehicle of Clauses 18 or 19, wherein the modulator comprises:

one or more anodes;

one or more cathodes; and one or more electromagnets.

As described herein, examples of the subject disclosure provide systems and methods for communicating through plasma. Further, examples of the present disclosure provide a vehicle that includes a system for communicating through a plasma sheath.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for communicating through a plasma sheath formed on a vehicle, the system comprising:
   an antenna having a boresight;
   a matching layer covering the boresight of the antenna, wherein the matching layer is configured to generate a resonant frequency in relation to the plasma sheath; and a modulator configured to generate one or more electromagnetic waves that modulate the resonant frequency, wherein the modulator comprises:
   an anode;
   a cathode separated from the anode by a gap; and
   an electromagnet, wherein the antenna is disposed above the gap between the anode and the cathode.

2. The system of claim 1, wherein the antenna is configured to one or both of transmit or receive one or more communication signals at one or more zero crossings.

3. The system of claim 2, wherein the modulator is configured to generate the one or more electromagnetic waves to operate the matching layer as a shutter that allows for communication at the one or more zero crossings.

4. The system of claim 1, further comprising a control unit configured to operate the modulator to modulate the resonant frequency.

5. The system of claim 4, wherein the control unit is configured to monitor a variation of an electric field across the plasma sheath to determine and temporally synchronize the resonant frequency.

6. The system of claim 1, wherein the vehicle is one of a hypersonic aircraft or spacecraft.

7. The system of claim 1, wherein the antenna is configured to operate at or above 30 GHz.

8. The system of claim 1, wherein the matching layer is a layer of electrically insulating material.

9. The system of claim 1, wherein the matching layer is disposed between the antenna and an outer portion of the vehicle.

10. The system of claim 1, wherein the resonant frequency is 2 GHz.

11. A method for communicating through a plasma sheath formed on a vehicle, the method comprising:
   covering a boresight of an antenna of the vehicle with a matching layer;
   generating, by the matching layer, a resonant frequency in relation to the plasma sheath; and
   generating, by a modulator, one or more electromagnetic waves that modulate the resonant frequency, wherein the modulator comprises:
   an anode;
   a cathode separated from the anode by a gap; and
   an electromagnet, wherein the antenna is disposed above the gap between the anode and the cathode.

12. The method of claim 11, further comprising one or both of transmitting or receiving, by the antenna, on or more communication signals at one or more zero crossings.

13. The method of claim 12, wherein said generating, by the modulator, the one or more electromagnetic waves comprises generating the one or more electromagnetic waves to operate the matching layer as a shutter that allows for communication at the one or more zero crossings.

14. The method of claim 11, further comprising operating, by a control unit, the modulator to modulate the resonant frequency.

15. The method of claim 11, wherein the vehicle is one of a hypersonic aircraft or spacecraft.

16. The method of claim 11, wherein the antenna operates at or above 30 GHz, and wherein the resonant frequency is 2 GHz.

17. The method of claim 11, wherein said disposing comprises disposing the matching layer between the antenna and an outer portion of the vehicle.

18. A hypersonic vehicle comprising:

a system for communicating through a plasma sheath formed on the hypersonic vehicle, the system comprising:

an antenna having a boresight;

a matching layer covering the boresight of the antenna, wherein the matching layer is a layer of electrically insulating material, wherein the matching layer is configured to generate a resonant frequency in relation to the plasma sheath, and wherein the matching layer is disposed between the antenna and an outer portion of the vehicle;

a modulator configured to generate one or more electromagnetic waves that modulate the resonant frequency, wherein the modulator comprises:

an anode;

a cathode separated from the anode by a gap; and an electromagnet, wherein the antenna is disposed above the gap between the anode and the cathode; and a control unit configured to operate the modulator to modulate the resonant frequency, wherein the antenna is configured to one or both of transmit or receive one or more communication signals at one or more zero crossings.

19. The hypersonic vehicle of claim 18, wherein the antenna is configured to operate at or above 30 GHz, and wherein the resonant frequency is 2 GHz.

20. The system of claim 18, wherein the modulator is configured to generate the one or more electromagnetic waves to operate the matching layer as a shutter that allows for communication at the one or more zero crossings.

* * * * *